United States Patent [19]
Franck et al.

[11] 3,903,195
[45] Sept. 2, 1975

[54] ISOMERIZING HYDROCARBONS WITH A HALOGEN-CONTAINING CATALYST

[75] Inventors: Jean-Pierre Franck, Bougival; Germain Martino, Poissy; Bernard Torck, Boulogne-sur-Seine, all of France

[73] Assignee: Institut Francaise du Petrole, des Carburants et Lubrifiants, Rueil-Malmaison, France

[22] Filed: Nov. 7, 1973

[21] Appl. No.: 413,636

[30] Foreign Application Priority Data
Nov. 10, 1972 France .............................. 72.39972

[52] U.S. Cl. .......... 260/683.68; 252/430; 260/666 P
[51] Int. Cl. .............................................. C07c 5/30
[58] Field of Search ...... 260/683.65, 683.68, 666 P; 252/430

[56] References Cited
UNITED STATES PATENTS

| | | | |
|---|---|---|---|
| 3,248,320 | 4/1966 | White et al. | 260/683.68 |
| 3,412,174 | 11/1968 | Kroll | 260/683.9 |
| 3,536,632 | 10/1970 | Kroll | 208/138 |
| 3,789,082 | 1/1974 | Cook et al. | 260/683.68 |

*Primary Examiner*—Paul M. Coughlan, Jr.
*Attorney, Agent, or Firm*—Millen, Raptes & White

[57] ABSTRACT

Process for isomerizing a saturated hydrocarbon which is carried out in the presence of a catalyst obtained by contacting a catalyst carrier with a group VIII noble metal compound and with a hydrocarbylaluminium halide.

14 Claims, No Drawings

ISOMERIZING HYDROCARBONS WITH A HALOGEN-CONTAINING CATALYST

This invention concerns a process for isomerizing hydrocarbons with a catalyst containing a noble metal from group VIII of the periodic classification of elements, supported on an inorganic or organic solid carrier.

It is already known that the isomerization of straight chain saturated hydrocarbons becomes more efficient as the temperature is decreased but that only a few catalysts have a sufficient activity for being used in this operation.

According to a known technique, isomerization catalysts are prepared by incorporating aluminum trichloride in platinum/alumina catalysts. This can be achieved by sublimating aluminum trichloride or by incorporating an alkyl-aluminum compound and subsequently converting the same to aluminum trichloride by means of a halogenating agent, for example H Cl.

This invention is based on a different concept since it makes use directly, as the isomerization catalyst, of the reaction product of a hydrocarbylaluminum halide with a carrier such as alumina and a noble metal compound.

The catalysts used in the process of this invention are obtained by contacting a catalyst carrier with a compound of a noble metal from group VIII of the classification and with a hydrocarbylaluminum halide.

The latter has preferably the general formula $AlX_yR_{(3-y)}$ in which $y$ may be 1 or 2, X is a halogen, preferably chlorine and R is a hydrocarbon monovalent radical, for example a saturated, linear or branched alkyl radical which may contain from 1 to 20 carbon atoms.

The step of contacting the carrier with the compound of a metal from group VIII may be achieved before, after or simultaneously with the step of contacting the carrier with the aluminum compound.

As examples of R radicals, there are: methyl, ethyl, normal propyl, normal butyl, iso butyl, phenyl, benzyl and cyclohexyl.

We can make use, for example, of the following hydrocarbylaluminium halides: diethylaluminium chloride, dodecylaluminium dichloride, disobutylaluminum chloride, diphenylaluminum fluoride, benzylaluminum dichloride, cyclohexylaluminum dichloride, hexylaluminum difluoride.

The hydrocarbylaluminum halide may be a single, well defined compound or a mixture, either stoichiometrical or not of various compounds; we can use, for example, a sesquichloride, such as ethylaluminum sesquichloride of the formula $Al_2Cl_3(C_2H_5)_3$.

It is necessary for the catalyst to contain one or more metals or compounds of metals having a hydrogenating action, pertaining to group VIII of the periodic classification. The preferred metal is a metal from the platinum family, for example Ru, Rh, Pd, Os, Ir and/or Pt. Its metal content may be from 0.05 to 2% by weight and preferably, from 0.1 to 1% by weight. The metals from the platinum group which are the most particularly suitable are platinum and palladium. The catalyst may also contain associations of catalytic metals, the additional metals pertaining, for example, to other groups than group VIII. Among said associations, we can mention platinum-iridium, platinum-ruthenium, platinum-tungsten, platinum-manganese, platinum-rhenium, platinum-palladium, platinum-iridium-thallium or platinum-iridium-manganese. The hydrogenating metal or metal compound may be introduced into the catalyst by any known method. For example, we may precipitate the platinum group metal in the form of a sulfide, or impregnate the carrier by means of chloroplatinic acid or any equivalent acid of another metal.

The preferred carriers are the oxides of metals from groups II, III and/or IV of the periodic classification of elements, such for example as the oxides of magnesium, aluminum, titanium, zirconium, thorium or silicium, used either separately or as a mixture or with oxides of other elements of the periodic classification such for example as boron and/or antimony. There can also be used carbon or the protonic form of a molecular sieve.

The preferred carrier consists essentially of alumina. The most suitable aluminas for the preparation of these catalysts are porous aluminas of high specific surface containing hydrogen which is generally assumed to be in the form of hydroxyl groups. For example, excellent results may be obtained by aluminas prepared by calcination of a β-alumina trihydrate such as bayerite or a mixture of this type of alumina with other calcinated alumina hydrates; however, aluminas prepared by calcinating other alumina hydrates such as α-alumina trihydrates or gibbsites, α-alumina mono hydrates or alumina obtained by hydrolysis of aluminum alcoholate may also be convenient. These aluminas are generally remarkable by their very high specific surface, in most cases from 180 to 500 m²/g or even more. The most active catalysts are generally obtained when this specific surface is higher than 200 m²/g and more particularly higher than 300 m²/g.

Before introducing the hydrocarbylaluminum halide, it is essential to subject the substance to be halogenated to a treatment for removing the greatest amount of water and oxygen adsorbed on the catalyst carrier; a calcination may be suitable, provided it is carried out at such a temperature that the so-called constitutive-OH groups are not removed during this treatment. For example, with an alumina having a specific surface equal to or higher than 5 m²/g, the calcination may be conducted between 200° and 600°C and preferably between 300° and 500°C. In some cases, it may be advantageous to carry out, after the calcination step, a treatment with hydrogen at a temperature from 200° to 600°C and preferably from 300° to 500°C in order to reduce the noble metal deposited on or incorporated in the considered oxide.

The hydrocarbylaluminum halide is generally used in solution in a liquid saturated or unsaturated, linear or branched hydrocarbon containing for example from 5 to 20 carbon atoms or in another inert solvent, in particular a halogenated hydrocarbon. We can use advantageously pentanes, hexanes or heptanes. The halide may be used at a concentration up to the limit of solubility in the considered solvent.

It seems, as a general rule, that a true reaction occurs between the halide and the carrier, for example alumina. This reaction being in most cases quantitative, nearly all the halide contained in the solution, in the form of $AlX_yR_{(3-y)}$, will be present in the catalyst. It is therefore unnecessary, in most cases, to make use of an excess of this agent.

The halide content may reach several tens % by weight with respect to the solid material and, accordingly, there will be generally a very large excess of hydrocarbylaluminum halide with respect to the noble metal contained in the carrier. It appears therefore quite surprising that, by such a technique, there can be obtained catalysts which are active for hydroisomerization since it is known, on the contrary, that catalysts of platinum on alumina, when treated by an excess of triethylaluminum, become active in hydrogenation only after a subsequent treatment with hydrogen at 650°C and that, in this case, the activity of these catalysts is lower than that of the catalysts which have not been treated with triethylaluminum and have been merely reduced by hydrogen at 427°C.

The reaction between the carrier and the hydrocarbylaluminum halide is preferably conducted in an atmosphere free from oxygen and/or oxygenated compounds; in fact, the halogenation agents such, for example, as hydrocarbylaluminum chlorides Al $Cl_yR_{3-y}$ are pyrophoric; however it must be emphasized that the halogenated catalysts obtained according to the process of the invention are not pyrophoric. Moreover, it is advantageous to conduct the reaction in an atmosphere free from sulfur and/or nitrogen compounds. Thus, it is possible to efficiently carry out the reaction in an atmosphere of rare gas, hydrogen, nitrogen or gaseous hydrocarbon, these various compounds being taken alone or as mixtures and preliminarily made free from the above-mentioned compounds.

The reaction which consists of contacting the hydrocarbylaluminum halide or its solution with the substance to be halogenated, may be carried out under atmospheric pressure or any other pressure, in an atmosphere such as hereinabove described, in the gaseous or liquid phase at a temperature generally from 0° to 250°C, but which may be as high as 300°C, in a static or dynamic manner. No subsequent heating is necessary and the later is even, as a rule, preferably avoided.

It is remarkable that said halogenation technique may be used at temperatures higher than 180°C, particularly from 180° to 300°C. It is therefore apparent that this technique is substantially different from the techniques consisting of introducing the aluminum trichloride into the platinum alumina catalyst. As a matter of fact, at those high temperatures, aluminum trichloride would sublimate and would not remain on the catalyst.

In the case of a static operation, said operation, which involves impregnation of a carrier, may be conducted either under dry or wet conditions.

In the case of a dynamic operation, the solution of the halogenating agent may be circulated over the substance to be halogenated, which is arranged in a fixed bed, at a hourly rate of, for example, from 1 to 100 liters of solution per kilogram of catalyst to be halogenated.

The last technique is generally preferred, since:

it makes it possible to halogenate the catalyst carrier within the reactor itself;

it makes it possible to use the minimum amount of solvent which is compatible with the solubility, irrespective of the halogen amount to be introduced into the catalyst, by a continuous recycling of the solution;

it makes it possible to make use, as solvent for the halogenating agent, of the hydrocarbon feedstock which must be converted by means of the catalyst, without substantial loss of the starting material.

Thus, in the case of a chlorination, it is possible to incorporate to the catalyst, from 1 to 20% by weight of chlorine, preferably from 4 to 12% according to the nature and the surface of the carrier. When using another halide than a chloride, the amount of incorporated halide is substantially of the same magnitude.

It is also possible to incorporate a portion of the halogen by means of the present method and another portion by means of another already known method.

A particularly interesting application of the process of the invention consists in the preparation of catalysts active for hydroisomerization at low temperature of paraffins containing for example, from 4 to 7 carbon atoms.

A preferred catalyst may be obtained by treating alumina by means of an amount of hydrocarbylaluminum chloride, expressed as chloride, corresponding to at least 3% by weight, so as to incorporate, for example, from 3 to 20% by weight of chlorine to said alumina. Platinum or another noble metal is introduced in a known manner, for example by impregnation by means of chloroplatinic acid, either before or after the above-mentioned treatment, in an amount of from 0.05 to 2% by weight, into the catalyst. This treatment is advantageously followed with heating in hydrogen atmosphere at a temperature of from 100° to 600°C, so as to reduce the platinum compound to platinum metal. A catalyst of this type may be obtained by treating according to the process of the invention, a conventional catalyst of platinum on alumina. The resulting catalyst may subsequently be used in isomerization, under hydrogen atmosphere, of saturated hydrocarbons containing from 4 to 7 carbon atoms and preferably, 5 and/or 6 carbon atoms, at a temperature of from 50° to 250°C, for example 100° to 200°C, and preferably 100° to 150°C. The operation is preferably conducted under a pressure of from 5 to 100 kg/cm² at a spatial velocity of 0.2 to 10 liters of feedstock per liter of catalyst and per hour. The molar ratio $H_2$/hydrocarbon is, for example, from 0.01 : 1 to 20 : 1, and preferably from 1.5 : 1 to 10 : 1.

By way of example, as starting material which can be isomerized according to the process of the invention, there may be mentioned the following hydrocarbons: n-butane, n-pentane, n-hexane, methylpentane, methylcyclopentane, cyclohexane, heptane or mixtures thereof.

We may introduce, either continuously or intermittently, in the charge, a halogenated promoter selected from the free halogens, the halohydric acids and the hydrocarbyl halides, for example, hydrochloric acid, chlorine, hydrofluoric acid or an alkyl halide such, for example, as ethyl chloride, isopropyl chloride, tertiobutyl chloride, chloroform, dichloromethane, methyl chloride, trichlorethylene or tertiobutyl bromide, in a proportion of for example, from 10 to 10,000 ppm by weight with respect to the hydrocarbon feedstock. Still higher proportions may be used but they do not result in any substantial advantage. The alkyl halides contain, for example, from 1 to 6 carbon atoms per molecule.

It has been observed that the totality or at least a large portion of the halide introduced in the form of a halogenated promoter could be found again in the reactor outflow, either as such or in the form of halohydric acid. The promoter or products derived therefrom can therefore be recovered at the outlet of the reaction zone and recycled to the inlet thereof. It suffices to add some fresh promoter, either periodically or in a continuous manner, in a small proportion of, for example, from 10 to 100 ppm by weight with respect to the hydrocarbon charge, in order to compensate the losses.

The following examples are given for illustrating the invention without, however, limiting the scope thereof.

EXAMPLE 1

Impregnation technique No. 1 (static)

In a reactor of stainless steel, of the Grignard type, equipped with a device for injecting a liquid compound under pressure and under controlled atmosphere, we introduce 100 g of a reforming catalyst having a 0.35 % by weight content of platinum deposited on an alumina having a specific surface of 416 m²/g and a total pore volume of 0.6 cc/g, previously roasted for one hour in air at 400°C. After having quickly closed the reactor, vacuum is made therein for one hour by means of a pump. Thereafter, argon is introduced into the reactor.

The temperature being maintained at 50°C and the pressure at two absolute bars, we introduce into the reactor 200 cc of a solution containing 1 mole/liter of ethyl-aluminum dichloride in normal hexane.

After stirring for half an hour at 50°C, still under argon atmosphere, the solvent is discharged and the solid is dried.

The resulting product contains about 0.3% by weight of platinum and 11.9% by weight of chlorine and forms a hydroisomerization catalyst.

EXAMPLE 2

Impregnation technique No. 2 (dynamic)

In a tubular reactor of stainless steel, we arrange a bed of 100 g of catalyst identical to that used in example 1 and previously roasted in the same manner.

The reactor is then scavenged by means of a dry hydrogen stream at a rate of 50 liters of hydrogen per liter of catalyst and per hour, at a temperature of 50°C and under a pressure of two absolute bars. After that, we introduce, by means of a pump, 1 liter of a solution containing 0.2 mole per liter of $AlCl_2(C_2H_5)$ in normal heptane, at a rate of 500 cc/hour and with a recycling of the reactor effluent.

After 8 hours of circulation, the pump is stopped, the solvent is discharged and the solid dried under hydrogen atmosphere. The analysis carried out on the halogenated solid shows that the latter contains 11.7% by weight of chlorine and 0.3% by weight of platinum.

This example shows that the impregnation technique under dynamic conditions leads to the same results as the impregnation technique in static conditions.

EXAMPLES 3 to 13

In this set of examples, we have used both impregnation techniques of examples 1 and 2. In all of these examples, we have used 100 g of a carrier containing 0.35 % by weight of noble metals from group VIII. The solid material, after calcination, has been subjected to a treatment at 400°C in hydrogen, under atmospheric pressure, during 2 hours, in order to reduce the metal from group VIII before reaction with the aluminum compound. After the latter reaction, carried out at a temperature in the range of from 50° to 170°C, the catalyst was cooled and ready for use. No heating above 170°C was carried out.

| Ex No | Carrier (1) | Noble metal (1) | Surface m²/g | Roasting t °C | Halogenating agent | Solvent | Amount of Hal Agent in moles | atm. | °C | Analysis (% b.w. of halogen introduced) | Technique |
|---|---|---|---|---|---|---|---|---|---|---|---|
| 3 | $Al_2O_3$ | Ru-Rh(50/50) | 220 | 400 | $AlCl_2(C_2H_5)$ | 300 cc nC₇ | 0.1 | He | 50 | 5.8 | 1 |
| 4 | $Al_2O_3$ | Pt | 220 | 400 | $AlCl(C_2H_5)_2$ | 300 cc nC₇ | 0.1 | He | 50 | 3.0 | 1 |
| 5 | $Al_2O_3$ | none | 220 | 400 | $AlCl_2$ (iso bu) | 200 cc nC₆ | 0.1 | He | 170 | 5.9 | 1 |
| 6 | $Al_2O_3$ | Pt-Ir(50/50) | 416 | 400 | $Al_2Cl_3(C_2H_5)_3$ | 2 liters nC₇ | 0.1 | $N_2$ | 100 | 8.9 | 2 |
| 7 | $SiO_2$ | Pt | 190 | 500 | $AlCl_2(C_2H_5)$ | 200 cc nC₆ | 0.02 | $H_2$ | 100 | 1.3 | 1 |
| 8 | $SiO_2$ | Ir | 190 | 500 | $AlCl_2(C_2H_5)$ | 300 cc nC₁₀ | 0.02 | $CH_4$ | 150 | 1.2 | 1 |
| 9 | $SiO_2$-$Al_2O_3$ (60% $SiO_2$) | Os | 330 | 350 | $AlCl_2(C_2H_5)$ | 2 liters nC₇ | 0.1 | $N_2$ | 100 | 6.3 | 2 |
| 10 | $Al_2O_3$ | Pt | 416 | 400 | $Al_2Cl_3(C_2H_5)_3$ | 2 liters nC₇ | 0.1 | $H_2$ | 100 | 8.8 | 2 |
| 11 | $Al_2O_3$ | Pt | 416 | 400 | $Al_2Cl_3(C_2H_5)_3$ | 200 cc nC₇ | 0.1 | $H_2$ | 100 | 8.7 | 1 |
| 12 | $Al_2O_3$ | Pd | 416 | 400 | $AlCl_2(C_2H_5)$ | 200 cc nC₇ | 0.1 | $H_2$ | 100 | 5.6 | 1 |
| 13 | $Al_2O_3$ | Pt | 490 | 400 | $AlCl_2(C_2H_5)$ | 3 liters nC₇ | 0.3 | $N_2$ | 100 | 19.7 | 2 |

(1) Proportions are by weight.

EXAMPLE 14

According to the technique of example 1, we treat 100g of alumina having a specific surface of 220 m²/g by means of a solution containing 0.1 mole of $AlCl_2(C_2H_5)$ in 300cc of normal hexane. After 1 hour of stirring at 100°C, we introduce 100 cc of a solution containing 0.5 g of platinum in the form of platinum acetyl acetonate in normal hexane. After stirring for 1 hour at 100°C, the solvent is discharged. The reactor is then put under hydrogen atmosphere and heated for 1 hour at 200°C under hydrogen atmosphere.

The resulting product contains 0.45 % by weight of platinum and 5.7% by weight of chlorine. It has been efficiently used for isomerizing paraffins having 5 and 6 carbon atoms in the molecule.

EXAMPLE 15

In the tubular reactor of the unit used in example 2, 50 cc of the catalyst obtained according to example 10 are placed in fixed bed. The reactor being maintained under hydrogen circulation at 150°C and 20 absolute bars, we inject normal hexane containing 5,000 ppm by weight of tertiary butyl chloride at a rate of 1 liter per liter of catalyst and per hour, while maintaining a hydrogen flow rate such that the molar ratio $H_2/nC_6$ be equal to 3.

The analysis of the liquid outflow from the reactor shows that the latter contains 13% by weight of normal hexane and 87% by weight of isomers of normal hexane.

EXAMPLE 16

In the tubular reactor already used above, we arrange in a fixed bed 50 cc of the catalyst prepared according to example 11. The reactor being maintained under hydrogen circulation at 150°C and 20 absolute bars, we inject a hydrocarbon charge containing 50% by weight of normal pentane and 50% by weight of normal hexane to which 1,000 ppm by weight of carbon tetrachloride have been added. The charge is injected at a rate of 2 liters per liter of catalyst and per hour while maintaining a hydrogen hourly flow rate such that the molar ratio hydrogen/hydrocarbons be 3.

The analysis of the reactor outflow shows that the latter has the following composition:
 iso pentane: 25% by weight
 normal pentane: 25% by weight
 iso hexanes: 42.5% by weight
 normal hexane: 7.5% by weight
 so that $iC_5/\Sigma C_5 = 50\%$ and $iC_6/\Sigma C_6 = 85\%$

EXAMPLE 17

In a tubular reactor we place in a fixed bed 100 g of a reforming catalyst containing 0.35% by weight of platinum deposited on an alumina having a specific surface of 220 m²/g and a total pore volume of 0.65 cc/g; this catalyst was previously roasted for 1 hour in air at 400°C. The reactor is then scavenged by means of a dry hydrogen stream at a rate of 50 liters of hydrogen per liter of catalyst and per hour at a temperature of 250°C and under an absolute pressure of 2 bars. After that, we inject, by means of a pump, one liter of a solution containing 0.1 mole/liter of Al Cl₂(C₂H₅) in normal hexane, at a rate of 300 cc/hour, while recycling the reactor effluent and maintaining the temperature at 250°C and the hydrogen flow rate at 50 liters per liter of catalyst and per hour. The analysis of the resulting catalyst shows that the latter contains 5.9% by weight of chlorine and 0.32% by weight of platinum.

After having retained in the reactor only 50 cc of said fixed bed catalyst, the temperature and pressure conditions in the reactor are adjusted and maintained at 150°C and 20 absolute bars under hydrogen circulation.

Normal pentane having a water content lower than 10 ppm by weight is injected at a rate of 1 liter per liter of catalyst and per hour, while maintaining such a hydrogen flow rate that the molar ratio $H_2/nC_5$ be equal to 3.

The reactor effluent, analyzed by gaseous phase chromatography, has the composition, expressed versus time, given in the following table:

This example shows that the catalyst used according to the invention has a good initial activity but loses a part of said activity progressively.

The following example shows the effect of the halogenated promoter.

EXAMPLE 18

In the same tubular reactor as previously used, we place again 50 cc of the halogenated catalyst prepared according to example 17.

The reactor being maintained at 150°C, under hydrogen circulation, under a pressure of 20 absolute bars, we inject normal pentane at a rate of 1 liter per liter of catalyst and per hour, while maintaining such a hydrogen flow rate that the molar ratio $H_2/nC_5$ be equal to 3. We also inject gaseous hydrochloric acid at a rate of 952 parts (expressed as chlorine) by weight per million of parts by weight of n-pentane.

The reactor effluent has versus time, the composition indicated in the following table.

| Time in hours<br>Products<br>% by weight | Charge | 3 | 6 | 9 | 15 | 50 | 100 |
|---|---|---|---|---|---|---|---|
| Hydrocarbons <C₅ | 0.05 | 0.95 | 0.6 | 0.5 | 0.4 | 0.4 | 0.4 |
| Isopentane | 0.4 | 50.15 | 51.4 | 50.1 | 52.5 | 52.0 | 52.1 |
| n pentane | 99.1 | 48.40 | 47.5 | 48.9 | 46.6 | 47.1 | 47.0 |
| Cyclopentane | 0.5 | 0.5 | 0.5 | 0.5 | 0.5 | 0.5 | 0.5 |
| Chlorine content at the reactor outlet (ppm b.w.) (1) | 952 | 975 | 955 | 960 | 948 | 957 | 959 |

(1) Content of chlorinated compounds in the charge and in the hydrocarbon effluent from the reactor, calculated as Cl₂.

This example shows:

a. That the use of a halogenated promoter makes it possible to substantially maintain constant the catalyst activity over long periods.

b. That the promoter does not react with the catalyst and does not combine therewith. As a matter of fact, the whole chlorine amount is present in the effluent.

EXAMPLE 19

In the same tubular reactor as previously used, we place 50 cc of the catalyst prepared according to example 13.

The reactor being maintained at 140°C under hydrogen circulation, under a pressure of 40 absolute bars, we inject normal pentane containing 947 ppm by weight (expressed as chlorine) of ethyl chloride at a rate of 1 liter per liter of catalyst and per hour, while maintaining a such hydrogen flow rate that the molar ratio $H_2/nC_5$ be equal to 4.

The reactor effluent has, versus time, the following composition:

| Time in hours<br>Products %<br>by weight | Charge | 3 | 6 | 9 | 15 | 30 | 50 |
|---|---|---|---|---|---|---|---|
| Hydrocarbons <C₅ | ≤0.05 | 0.9 | 0.7 | 0.5 | 0.5 | 0.4 | 0.5 |
| Isopentane | 0.4 | 48.2 | 43.0 | 32.0 | 12.5 | 10.9 | 7.9 |
| n pentane | 99.1 | 50.4 | 55.8 | 67.0 | 86.5 | 88.2 | 91.1 |
| Cyclopentane | 0.5 | 0.5 | 0.5 | 0.5 | 0.5 | 0.5 | 0.5 |

| Time in hours<br>Products<br>% by weight | Charge | 3 | 6 | 9 | 15 | 50 | 100 |
|---|---|---|---|---|---|---|---|
| Hydrocarbons <$C_5$ | ≤ 0.05 | 0.9 | 0.7 | 0.4 | 0.4 | 0.3 | 0.3 |
| Isopentane | 0.4 | 64.5 | 71.3 | 76.5 | 76.0 | 77.0 | 77.1 |
| n pentane | 99.1 | 34.1 | 27.5 | 22.6 | 23.1 | 22.2 | 22.1 |
| Cyclopentane | 0.5 | 0.5 | 0.5 | 0.5 | 0.5 | 0.5 | 0.5 |
| Chlorine content at the reactor outlet b.w. (1) | | 947 | 966 | 965 | 958 | 961 | 960 | 957 |

(1) Content of chlorinated compounds in the charge and in the hydrocarbon effluent from the reactor, calculated as $Cl_2$.

The conclusions are the same as in the preceding example.

What we claim as this invention is:

1. In a process for isomerizing a saturated hydrocarbon at 50°–250°C in which said saturated hydrocarbon is contacted with a catalyst containing at least one noble metal from group VIII of the periodic classification of elements, the improvement comprising carrying out said isomerizing in the presence of a catalyst obtained by contacting a substantially water and molecular oxygen free solid carrier having constitutive-OH groups with a compound of a noble metal from group VIII and with a hydrocarbylaluminum halide.

2. A process according to claim 1, in which the hydrocarbylaluminum halide has the formula Al $X_y R_{(3-y)}$ in which y is 1 or 2, X is a halogen and R is a monovalent hydrocarbon radical, and is used in a proportion of 1 to 20% by weight expressed as halogen with respect to the catalyst.

3. A process according to claim 1, in which the noble metal is used in a proportion of from 0.05 to 2% by weight with respect to the catalyst.

4. A process according to claim 1 in which the catalyst carrier is alumina.

5. A process according to claim 1, in which the step of contacting the carrier with the hydrocarbylaluminum halide is carried out at a temperature of from 0° to 250°C.

6. A process according to claim 1, in which the carrier is first contacted with the noble metal compound and then treated with hydrogen at 100°–600°C and finally contacted with the hydrocarbylaluminum halide.

7. A process according to claim 1, in which the isomerization is carried out in the presence of hydrogen at a temperature of from 50° to 250°C.

8. A process according to claim 1, in which the isomerization is carried out in the presence of hydrogen at a temperature of from 100° to 150°C.

9. A process according to claim 1, in which the isomerization is carried out in the presence of a halogenated promoter selected from the free halogens, the halohydric acids and the hydrocarbyl halides, used in a proportion of from 10 to 10,000 parts per million of parts by weight with respect to the hydrocarbon.

10. A process according to claim 9, in which the promoter is recovered after isomerization and subsequently reused in the isomerization process.

11. A process according to claim 1 wherein the saturated hydrocarbon has 4-7 carbon atoms, the isomerization temperature is 100°–150°C, the carrier is alumina, sufficient hydrocarbylaluminum chloride, expressed as chloride, is incorporated in the alumina to obtain 3–20% by weight of chlorine to said alumina, the noble metal is incorporated in the catalyst in an amount of 0.05–2% weight, the isomerization is conducted under a pressure of 5–100 kg/cm$^2$ at a spatial velocity of 0.2–10 liters of saturated hydrocarbon per liter of catalyst per hour, and hydrogen is employed in a molar ratio H$_2$/hydrocarbon of 1.5 : 1 to 10 : 1.

12. A process according to claim 11 wherein the saturated hydrocarbons have 5 or 6 carbon atoms.

13. A process according to claim 1 wherein prior to being contacted with the hydrocarbylaluminum halide, the solid carrier is calcined at a temperature sufficiently high to remove adsorbed water and oxygen but not so high as to remove the constitutive-OH groups.

14. A process according to claim 13 wherein the solid carrier is alumina having a specific surface equal to or higher than 5 $^2$/g and the calcination is conducted at 200°–600°C.

* * * * *

UNITED STATES PATENT OFFICE
CERTIFICATE OF CORRECTION

PATENT NO. : 3,903,195
DATED : September 2, 1975
INVENTOR(S) : Jean-Pierre Franck, Et Al It is certified that error appears in the above-identified patent and that said Letters Patent are hereby corrected as shown below:

<u>Claim 2 line 2</u>: "the formula $AlX_yR_{(3-4)}$" should be --the formula $AlX_yR_{(3-y)}$--

Signed and Sealed this sixteenth Day of December 1975

[SEAL]

Attest:

RUTH C. MASON
*Attesting Officer*

C. MARSHALL DANN
*Commissioner of Patents and Trademarks*